United States Patent Office 3,637,577
Patented Jan. 25, 1972

3,637,577
CURING OF FOUNDRY MOLDS AND CORES BY INDUCTION HEATING
Vernon L. Guyer, Minneapolis, and Robert J. Schafer, Edina, Minn., assignors to Ashland Oil, Inc., Ashland, Ky.
No Drawing. Filed June 19, 1967, Ser. No. 647,247
Int. Cl. C08g 51/04
U.S. Cl. 260—38
31 Claims

ABSTRACT OF THE DISCLOSURE

A process for the catalytic cross-linking of a curable material, comprising, in sequence, the steps of:
(A) forming a mixture comprising:
(1) the curable material, and
(2) a catalytic agent which, upon heating, releases a catalyst which promotes curing of the curable material, and
(3) an inductively heatable material in thermal proximity with the catalytic agent, and then
(B) subjecting the mixture to an alternating inductive field,
whereby the heat generated in the inductively heatable material is transferred to the catalytic agent, releasing the catalyst and promoting curing of the curable material.

A catalytic pill adapted to promote curing of a curable material when subjected to an alternating inductive field, said pill comprising:
(A) an inert catalytic agent which, upon heating, releases a catalyst which promotes curing of the curable material, and
(B) an inductively heatable material in thermal proximity with the catalytic agent.

This invention finds particular utility in the foundry art when the mixture further contains a foundry aggregate.

This invention relates to the promotion of the curing of curable materials by catalysts released from catalytic agents by an inductive field.

In general, heating accelerates the rate of cross-linking of curable materials, and it has been common practice to subject a mixture of the curable material and a catalyst to elevated temperatures such as those which can be maintained in a baking oven. However, when a formed article containing the curable material and the catalyst is placed in such an oven, the article heats from the outside towards the center, creating a temperature gradient in the article. Such a temperature gradient causes the various portions of the articles to cure at different rates. Depending upon the materials chosen, this uneven rate of curing can cause such undesirable properties as low strength, warping, breaking, and other undesirable defects.

In other processes, curable materials are used as binding agents for other materials. One example of such a use is the production of foundry cores or molds in which the curable material constitutes a binder for a foundry aggregate which is typically silica sand. Although the entire foundry mold containing the uncured binder can be placed in an oven and the entire article heated to such a temperature as will accelerate the curing, the wasted heat employed to raise the temperature of the entire article has resulted in uneconomical operation. In an effort to overcome these and other difficulties, it has been proposed to mix the binder with an inductively heatable material such as iron filings and then to subject the entire article to an alternating inductive field. Under the influence of this alternating inductive field, the iron filings are heated and transfer their heat by conduction to the binder which then cross-links under the influence of this heat. The use of such a process for the binding of wood is described in Kohler U.S. Pat. 2,393,541. Inductive heating of curable materials to form foundry cores or molds has also been suggested in French Pat. 1,035,967 and in Knight U.S. Pat. 3,259,947. Vulcanizable rubber has also been cross-linked under the influence of heat produced by inductively heatable materials, as described in Hodges U.S. Pat. 3,249,658.

Despite the obvious advantages of the above-described process employing heating by magnetic induction, a number of disadvantages and limitations have retarded its wider use. One disadvantage is the large amount of relatively expensive inductively heatable material that must be employed. Another disadvantage is the amount of electrical energy that must be employed to heat up the entire mass of curable material.

It is therefore an object of the present invention to provide a process for curing a curable material, which is free of the disadvantages of the prior art.

Another object of the present invention is to provide a process for curing curable materials, which is very economical by reason of the small amount of inductively heatable material and the small amount of electrical energy needed to effect the cross-linking.

Still another object of the present invention is to provide a novel binder for foundry molds or cores which can be cross-linked by means of an alternating inductive field.

A further object of the present invention is to provide novel catalytic pills which are normally inert, but which produce a cure promoting catalyst when subjected to an alternating inductive field.

Still further objects and advantages of the present invention will be apparent by reference to the following detailed description thereof.

In accordance with the present invention there is provided a process for the catalytic curing of a curable material, comprising, in sequence, the steps of:
(A) Forming a mixture comprising—
(1) the curable material, and
(2) a catalytic agent which, upon heating, releases a catalyst which promotes curing of the curable material, and
(3) an inductively heatable material in thermal proximity with the catalytic agent, and then
(B) Subjecting the mixture to an alternating inductive field, whereby the heat generated in the inductively heatable material is transferred to the catalytic agent, releasing the catalyst and curing the curable material. By the present invention there is also provided a catalytic pill adapted to cure a curable material when subjected to an alternating inductive field, said pill comprising:
(A) an inert catalytic agent which, upon heating, releases a catalyst which promotes curing of the curable material, and
(B) an inductively heatable material in thermal proximity with the catalytic agent.

The curable material can be any material which is curable under the influence of a catalyst. The curable materials useful in the present invention can be described as either resinous or inorganic. The resinous curable materials can consist of one component such as a melamine formaldehyde resin or can consist of two or more components such as compatible mixtures of two or more resins or coreactive constituents, an example of which is a mixture of certain phenolic resins and certain polyisocyanates, described more completely below. Examples of resinous materials which are curable under the influence of catalysts include, among others:

Furfuryl alcohol-formaldehyde resins
Furfuryl alcohol-formaldehyde-urea resins
Phenol-formaldehyde resins
Phenol-formaldehyde-urea resins
Urea-formaldehyde resins
Melamine-formaldehyde resins
Phenol-aldehyde resins of the benzylic ether type
Phenol-aldehyde-polyisocyanate resins.

An example of an inorganic curable material is sodium silicate. Certain of these curable materials useful in the present invention can be produced from commercially available reactants according to procedures well-known in the art. The production of other curable materials useful in the present invention is described herein.

The preferred curable materials which can be used in the present invention are a mixture of phenolic resin and polyisocyanate hardener. The catalyst employed with these preferred curable materials is a tertiary amine. These curable materials and catalysts are especially useful in the formation of foundry molds or cores when mixed with a foundry aggregate. These curable materials are generally made available as a two-package system comprising the phenolic resin component in one package and the hardener component in the other package, said resin component comprising an organic solvent solution of a non-aqueous phenolic resin, said hardener component comprising a liquid polyisocyanate having at least two isocyanate groups per molecule. At the time of use, the contents of the two packages are combined and then mixed with the foundry aggregate. Alternatively, first one component can be mixed with the foundry aggregate and then the other component added to this mixture. After a uniform distribution of the binder on the aggregate particles has been obtained, the resulting foundry mix is molded into the desired shape.

As indicated hereinabove, any non-aqueous phenolic resin which is soluble in an organic solvent can be employed in the present invention. The term "phenolic resin" as employed herein is meant to define any polymeric condensation product obtained by the reaction of a phenol with an aldehyde. The phenols employed in the formation of the phenolic resin are generally all phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substitutent can vary widely and it is only necessary that the substituent not interfere in the polymerization of the aldehyde with the phenol at the ortho-position. Substituted phenols employed in the formation of the phenolic resins include alkyl-substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 6 carbon atoms. Specific examples of suitable phenols, aside from the preferred unsubstituted phenol, include m-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by general Formula I:

(I)

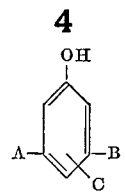

wherein A, B, and C are hydrogen, hydrocarbon radicals, oxyhydrocarbon radicals, or halogen. The preferred phenols of Formula I are those which are unsubstituted in the para-position as well as in the ortho-positions. The most preferred phenol is the unsubstituted phenol, i.e. hydroxybenzene.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is hydrogen or a hydrocarbon radical of 1 to 8 carbon atoms. The most preferred aldehyde is formaldehyde.

The phenolic resins employed in the binder composition can be either resole or A-stage resins or novolac resins. The resitole or B-stage resins, which are a more highly polymerized form of resole resins, are generally unsuitable. The phenolic resin employed must be liquid or organic solvent-soluble. Solubility in organic solvent is desirable to achieve the uniform distribution of the binder on the foundry aggregate. The substantial absence of water in the phenolic resin is desirable to prevent the poisoning of metal ion catalysts when such are used. The term "non-aqueous" as employed herein is meant to define a phenolic resin which contains less than 5% of water and preferably less than 1% of water based on the weight of the resin.

Although both the resole resins and the novolac resins can be employed in the binder compositions useful in the present invention and, when admixed with polyisocyanates and a foundry aggregate and cured by use of tertiary amines, form cores of sufficient strength and other properties to be suitable in industrial applications, the novolac resins are preferred over the resole resins. Many resole resins are difficulty soluble in volatile organic solvents and thus do not permit a uniform coating of the aggregate particles. Furthermore, resole resins are generally prepared in aqueous media and even on dehydration contain 10 or more percent of water. Novolac resins generally have a more linear structure and thus are more readily soluble in organic solvents. Because of their higher molecular weight and absence of methylol groups, novolac resins can, furthermore, be more completely dehydrated. The preferred novolac resins are those in which the phenol is prevailingly polymerized through the two ortho-positions. The preparation of novolac resins is known in the art and for that reason is not specifically referred to herein.

Particularly preferred phenolic resins are condensation products of a phenol of Formula II:

(II)

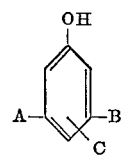

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins is disclosed in greater detail in copending application Ser. No. 536,180, filed Mar.

14, 1966, now Pat. No. 3,485,797. In the preferred form, these resins have the general Formula III:

(III)

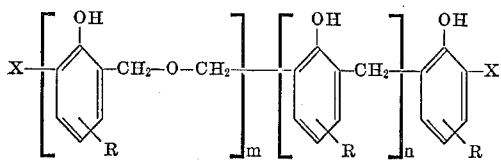

wherein R is a hydrogen or a phenolic substituent meta to the phenolic hydroxyl group, and the sum of $m$ and $n$ is at least 2 and the ratio of $m$ to $n$ is at least 1, and X is an end-group from the group consisting of hydrogen and methylol, the molar ratio of said methylol to hydrogen end-groups being at least 1.

The phenolic resin component of the binder compositions useful in the present invention is, as indicated above, generally employed as a solution in an organic solvent and preferably a volatile organic solvent. Suitable solvents include ethers and esters, ordinary mineral spirits, kerosene, and the like. The amount of solvent used is kept as low as possible but should be sufficient to result in a binder composition having a viscosity low enough to permit uniform coating of the binder compositions on the aggregate. The specific solvent concentrations for the phenolic resins will vary depending on the type of phenolic resin employed and its molecular weight. In general, the solvent concentration will be in the range of 30 to 80% by weight of the resin solution. It is preferred to keep the viscosity of this component at less than X–1 on the Gardner-Holdt scale.

The second component or package of the binder compositions useful in the present invention comprises an aliphatic, cycloaliphatic, or aromatic polyisocyanate having, preferably, from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates includes the aliphatic polyisocyanates such as hexamethylene diisocyanate, alicyclic polyisocyanates such as 4,4'-dicyclohexylmethane diisocyanate, and aromatic polyisocyanates such as 2,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof; polymethylene-polyphenol isocyanates; chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to coreact with the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis will be employed. The polyisocyanate is employed in liquid form. Solid or viscous polyisocyanates are employed in the form of organic solvent solutions. It will be clear that the organic solvent employed should be miscible with the solvent employed for the phenolic resin. Preferred solvents are hydrocarbon solvents and particularly aromatic hydrocarbon solvents such as xylene or toluene. The solvent concentration is preferably less than 50% by weight of the second component. On combining the two packages of the binder composition, the binder is then admixed with the foundry aggregate to form the foundry mix. Methods of distributing the binder on the aggregate particles are well-known to those skilled in the art.

The catalysts which are useful in the present invention are those which will promote curing of the curable material employed in the given embodiment. The catalysts for the above and other curable materials are well-known in the art. The most preferred catalysts are those which are gaseous at ambient conditions (68° F. 760 mm. Hg). Thus, the most preferred catalysts are those which have a vapor pressure greater than 760 mm. Hg at 68° F.

The curing of the curable materials useful in the present invention is promoted by various catalysts. Thus, the curing of furfuryl alcohol-formaldehyde resins is promoted by the hydrogen halides, examples of which include, among others, hydrogen bromide and hydrogen chloride, which is preferred. The curing of furfuryl alcohol-formaldehyde-urea resins, the phenol-formaldehyde resins, and the phenol-formaldehyde-urea resins is promoted by Lewis acids such as the halogens and the boron halides. Examples of suitable halogens include, among others, fluorine, bromine, iodine, and chloride, which is preferred. Examples of suitable boron halides include boron triiodide, boron tribromide, and most preferably boron trifluoride and boron trichloride. The preferred catalyst for the furfuryl alcohol-formaldehyde-urea resins is boron trifluoride, whereas a suitable catalyst for the phenol-formaldehyde resins is hydrochloric acid or chlorine and a suitable catalyst for the phenol-formaldehyde-urea resins is chlorine. The preferred resin for use in the present invention is a resin system of the above described phenolic resins in combination with the above described polyisocyanates. These resin systems are cross-linked by tertiary amines, as described more completely below. Carbon dioxide is the catalyst employed to cure sodium silicate.

The catalysts which promote the curing of the above-described phenolic resin-polyisocyanate mixtures are tertiary amines, the preferred class of which are tri-lower alkyl amines which can contain from one to three hydroxyl groups in the alkyl radical, such as dimethyl ethanol amine. However, the most preferred tertiary amines are those represented by Formula IV:

IV)  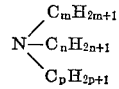

wherein $m$, $n$, and $p$ are each integers equal to 1 to 3 inclusive and $m+n+p$ equals 3 to 9 and preferably 3 to 5. The most preferred catalyst is trimethyl amine. Examples of other catalysts of Formula IV include, among others, triethyl amine, dimethyl ethyl amine, methyl diethyl amine, and triisopropyl amine. The higher the vapor pressure of the amine, the further it will penetrate the curable material from its point of release, giving a thorough and even curing of the curable material. Amines of low vapor pressure, such as trihexyl amine, can be vaporized by the heat generated in the inductively heatable material, but they condense on the curable material and the foundry aggregate when present and do not penetrate the mass of the mixture to an extent sufficient to promote the curing of the curable material. For these reasons, gaseous amines are preferred.

Since the catalysts employed in the present invention react rapidly to promote the curing of the curable material, a catalytic agent rather than a catalyst is employed in the mixture of the curable material and the inductively heatable material. These catalytic agents release the catalyst upon heating but are inert to the curable material in the absence of heat. One means for rendering the catalyst inert is by encapsulating it in a material which melts at a temperature between 90° F. and the degradation temperature of the curable material, which is usually about 700° F. or above. The encapsulating material maintains physical separation of the catalyst from the curable material until the encapsulating material is melted. Such an encapsulating material is paraffin wax, which melts at between 120° and 150° F. Another means for rendering the catalyst inert is to employ as a catalytic agent a compound, monomer, or polymer which dissociates or degrades upon heating to yield the catalyst. It is desirable to use as catalytic agents compounds, monomers, or polymers that yield the catalyst at a temperature which is between 90° F. and the degradation temperature of the curable material, and preferably between 120° and 300° F.

The catalytic agent must be in thermal proximity with the inductively heatable material in order that the heat generated in the inductively heatable material be transferred to the catalytic agent in order to release the catalyst and the curable material. This is preferably accomplished by mixing the catalytic agent with the inductively heatable material. In one embodiment of the present invention, the catalytic agent constitutes particulate activated carbon having the catalyst adsorbed thereon. This material can then be employed alone according to the present invention or can be admixed with a ferromagnetic material.

The catalytic agents for use with the phenolic resin-polyisocyanate mixtures are those which release tertiary amines upon being heated to a temperature between 90° F. and the degradation temperature of the curable material. The preferred catalytic agents are those which release tertiary amines at between 120° and 300° F. One class of a suitable catalytic agent are the amine imides of Formula V:

(V) 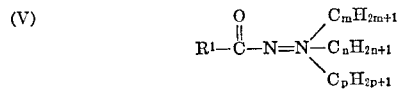

wherein $R^1$ is a hydrocarbon radical of 1 to 25 carbon atoms which can be substituted with up to five non-interfering substituents which do not materially alter the hydrocarbon nature of the radical, and wherein $m$, $n$, and $p$ have the above-described meanings.

A preferred class of the amine imides of Formula V are those of Formula VI:

(VI) 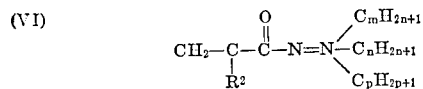

wherein $R^2$ is hydrogen, methyl or ethyl, but preferably methyl, and wherein $m$, $n$, and $p$ have the above-described meanings.

Examples of compounds of Formula VI include, among others, trimethylamine acrylamide, trimethylamine ethacrylimide, and most preferably trimethylamine methacrylimide, which decomposes at 266° F. to yield trimethylamine.

Trimethylamine methacrylimide is produced by reacting trimethyl chloride ($CH_3Cl$) with $NH_2N(CH_3)_2$ to produce $NH_2N(CH_3)_3Cl$ in aqueous solution at atmospheric pressure at temperatures between 0° and 100° C. The $NH_2N(CH_3)_3Cl$ is then reacted in aqueous solution at atmospheric pressure at a temperature between 0° and 100° C. with a compound of Formula VII:

(VII) 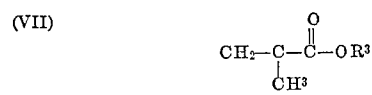

wherein $R^3$ is a lower alkyl radical of 1 to 8 carbon atoms.

The resultant product is trimethylamine methacrylimide. The trimethyl chloride can be replaced by other methyl halides such as trimethyl bromide. Other compounds of Formula V can be produced by similar procedures or according to procedures well known in the amine imide art. For certain applications, the addition polymer of the compound of Formula VI can be employed.

The formation of these addition polymers is described in U.S. application Ser. No. 514,705, filed Dec. 17, 1965 and now abandoned.

Although the catalytic agent and the inductively heatable material can be admixed separately with the curable material, it is preferred to employ the catalytic agent and the inductively heatable material in the form of a composite structure, hereinafter termed "a catalytic pill."

These catalytic pills are adapted to cross-link the curable material when subjected to an alternating inductive field, and comprise:

(A) an inert catalytic agent such as those described above which, upon heating, releases a catalyst which promotes curing of the curable material, and (B) an inductively heatable material in thermal proximity with the catalytic agent.

In a preferred embodiment, the inductively heatable material is in the form of a particulate solid and the catalytic agent is in the form of a coating on the surface of the particulate solid.

The catalytic agents can be deposited on the inductively heatable material by a variety of processes such as attachment with an adhesive or by precipitation from a saturated solution, which is the preferred process. The weight ratio of the inductively heatable material to the heat activable catalytic agent is greater than 0.001:1 and preferably between 0.01:1 to 100:1.

The catalytic pills adapted to release tertiary amines can be made by depositing these amine-releasing agents onto particles of inductively heatable material. For instance, trimethylamine methacrylimide can be deposited on the inductively heatable material from a solution of ethyl alcohol, water dimethylsulfoxide, trichloromethane, or acetone in which it is soluble, or from a solution of dioxane benzene or tertiary butyl alcohol in which it is slightly soluble. The solubility of the other amine-releasing agents in common solvents is either well-known or can be routinely determined.

Virtually any inductively heatable material can be employed, although certain inductively heatable materials are preferred. An inductively heatable material is any material that increases in temperature when placed in an alternating inductive field, and includes ferromagnetic and paramagnetic materials. Examples of ferromagnetic materials include iron, cobalt, magnetic ($Fe_3O_4$), alloys thereof and mixtures thereof. An especially useful alloy is the aluminum-nickel-cobalt alloy commercially available under the name "Alnico." Paramagnetic materials such as carbon can also be used. Ferromagnetic mtaerials are preferred over paramagnetic materials, iron being the preferred ferromagnetic material.

Both paramagnetic and ferromagnetic materials of certain particle sizes are heated by eddy currents when subjected to an alternating inductive field. The heating by eddy current effect is dependent upon the frequency of the alternating inductive field and the particle size of the inductively heatable material. In general, higher frequencies are required for the smaller particle sizes. For material of a given particle size, it is possible to decrease the frequency of the alternating inductive field to such a point that no heating of the particle occurs by eddy current effect. Paramagnetic materials of such a particle size, when subjected to such a frequency, are not "inductively heatable materials" as that term is used herein.

Ferromagnetic materials of all particle sizes are heated by hysteresis effect. The quantity of heat generated is dependent upon the frequency of the alternating inductive field, the inductively heatable material used, the maximum flux density, and the duration of exposure to the field, and is represented by the area enclosed within the hysteresis loop. The result of this generation of heat is a rise in temperature of the inductively heatable material. The temperature of the inductively heatable material is dependent upon the rate of generation of heat in the inductively heatable material and the rate of dissipation of heat from the material by radiation, conduction, and/or convection.

Ferromagnetic materials can, in general, be employed in widely varying particle sizes from less than those that pass through a 300 mesh/inch screen to greater than those which are retained on a 4 mesh/inch screen, although particles within this size range are preferred, and those which pass through a 10 mesh/inch screen and are retained on a 100 mesh/inch screen are the most preferred. Paramagnetic materials are used within these same size ranges but with the additional limitation that they have a particle size such that they are heated by eddy currents when subjected to a field of the frequency employed. In general, at 450 kc., particle sizes that pass through a 4 mesh/inch screen and are retained on a 40 mesh/inch screen are suitable, whereas at higher frequencies smaller particles can be employed. The determination of compatible frequencies and particle sizes for paramagnetic materials is well within the skill of the art. In commercial embodiments of the present invention, it is common practice to screen out only the larger particles such as those which are retained on a 4 mesh/inch screen, since there is no need to remove those particles which pass through a 300 mesh/inch screen unless they constitute a major portion (over 40 weight percent) of the total.

In that embodiment of the present invention wherein the heat-activable catalytic agent is absorbed onto the surface of the inductively heatable material, that material must be of such a particle size that it is rapidly raised to a temperature sufficient to acativate the cross-linking agent. Very small particles such as those which pass through a screen of 300 mesh/inch have such a high surface area-to-weight ratio that the heat generated therein is rapidly lost across the surface of the material and through the coating of the catalytic agent without ever raising the catalytic agent to the temperature necessary to release the catalyst.

In one embodiment of the present invention, the inductively heatable materials are in the form of a porous agglomerate of smaller sized particles. These smaller sized particles, such as those which pass through a screen of 300 mesh/inch, can be agglomerated by a variety of processes such as coating with an adhesive or sintering. Any adhesive such as animal, vegetable, or polymeric glues which have heretofore been employed to agglomerate fine particles can be used. Because of the porous nature of these agglomerates, they have a high surface area which facilitates adsorption of the catalytic agent thereon. Because a large amount of this surface is within the agglomerate, they do not suffer from the high rate of heat loss which accompanies the use of unagglomerated particles of the same size and surface area-to-weight ratio. The agglomerates generally have a particle size that permits them to pass through a 4 mesh/inch screen, but are retained on a 50 mesh/inch screen. The sintering procedures and conditions are well-known in the art and thus require no further description here. In general, any procedure which produces the above-described agglomerates is suitable.

The weight ratio of the inductively heatable material to the heat-activable catalytic agent is chosen such that the intensity (° F.) and quantity of heat (calories or B.t.u.'s) produced is sufficient to activate the catalytic agent and release the catalyst when exposed to the alternating inductive field of desired frequency and intensity for the desired length of time. In general, the weight ratio of the inductively heatable material to the heat-activable catalytic agent is greater than 0.001:1 and preferably between 0.01:1 to 100:1.

When the mixture of the curable material, the catalytic agent, and the inductively heatable material further comprises a particulate solid, the present invention is useful in the formation of foundry molds or cores and abrasive articles such as grinding wheels. When it is desired to form abrasive articles, hard particles are employed as the particulate solid, whereas when it is desired to form foundry molds or cores, a foundry aggregate is employed as the particulate solid. Suitable foundry aggregates are well-known in the art. These foundry aggregates are generally refractory in nature and have a melting point above that of the metal to be cast. Examples of suitable foundry aggregates include, among others, fire clay, carbon, and silica sand, which is preferred.

In an analogous manner, grinding wheels, whetstones, and the like can be manufactured if the particulate material is abrasive in nature. Examples of suitable abrasive particulate materials include, among others, garnet, silicon carbide, and the aluminum oxides. The particle sizes of these abrasive particles can be varied in a known manner to produce abrasive articles of varying degrees of abrasiveness.

The frequency of the inductive field can vary from about 800 cycles per second up to radio frequencies of about 4 megacycles per second. A typical machine capable of producing these inductive fields in the 25 kw. Toccotron Induction Machine, Model #5EG251, available from Tocco Division of the Ohio Crankshaft Company. In general, these and other machines have a primary coil and a secondary coil. The article to be subjected to the alternating industive field is placed within the cofines of the secondary coil. A current induced in the primary coil, which induces a current in the secondary coil. This induced current in the secondary coil creates an alternating inductive field within the confines of the coil and heats the inductively heatable material present in the article. The dimensions and the number of turns present in the coil can be varied widely to accommodate articles of varying dimensions. The intensity of the inductive field can be varied widely by varying the dimensions of the secondary coil, the number of turns, and the current or power in the primary coil. A single turn coil having an internal diameter of 2½ inches has been found suitable at 450 kilocycles and 11 kilowatts.

As previously described, the frequency of the alternating inductive field must be chosen with respect to the particle size when it is desired to effect heating by eddy currents alone, and also with regard to the rate of dissipation of heat from the heatable material across the surface thereof. For example, when using soft iron filings which pass through a 20 mesh/inch screen and are retained on a 50 mesh/inch screen, i.e. those having a diameter of about 0.016", a frequency of 450 kilocycles has been found suitable.

Varying proportions of the components of the foundry mixes of the present invention can be employed. The foundry aggregate can comprise from less than 90 to over 99 weight percent of the foundry mix, although it is preferably present within this range. The curable material is employed in an amount sufficient to bind the aggregate when cured, and generally comprises from 0.1% to 20%, and preferably from 0.1% to 5%, of the foundry mix. The catalyst is present in an amount sufficient to promote the cross-linking of the curable material present in the binder, and generally comprises between 0.001% to 2% of the foundry mix. The inductively heatable material is present in an amount sufficient to supply the necessary heat in order to release the catalyst from the catalytic agent, and is generally present in an amount from 0.1% to 25%, and preferably 0.1% to 5%, of the foundry mix.

The invention may be better understood by reference to the following examples in which all parts and percentages are by weight unless otherwise indicated. The screen sizes in mesh/inch referred to in the foregoing description and in the following examples are those of the U.S. Standard Sieve Series. These screen sizes can be converted to other systems such as the Tyler system by well-known procedures. These examples are illustrative of certain embodiments designed to teach those skilled in the art how to practice the invention and to represent the best mode contemplated for carrying out the invention, and are not intended to limit the scope thereof in any manner.

EXAMPLE 1

This example illustrates the synthesis of a phenol-formaldehyde resin of the benzylic ether type which is useful in the present invention.

This resin, termed Resin A, is obtained by charging to a reflux system 445 g. paraformaldehyde, 625 g. phenol, 2.5 g. lead naphthenate (24% Pb), and 67 g. toluene. The system is heated to reflux (235°–240° F.) and reacted for approximately 3 hours during which time toluene and water are distilled off. The reaction is continued until the free formaldehyde content of the resin is decreased to less than 1%. A vacuum is applied to distill off any residual water or solvent. The resin is then cooled to 190° F., and 350 g. furfuryl alcohol is added. The resulting resin is cooled to 75° F. and discharged from the reactor. The resin and solvent weight 1164 g. and is found to be a benzylic ether type of phenolic resin.

EXAMPLE 2

This example illustrates the synthesis of still another resin which is useful in the present invention.

This resin, termed Resin B, is obtained by charging 292 g. phenol, 63 g. paraformaldehyde, 2 g. zinc naphthenate, and 100 g. toluene. The reaction mixture is refluxed at 258°–266° F. for a period of 6.5 hours and then heated to 380° F. The resulting resin is an ortho-ortho-phenol formaldehyde resin of the novolac type.

EXAMPLE 3

This example illustrates certain commercially available resins useful in the present invention.

Resin C is a commercially available (Synco 2898C) acid-catalyzed phenol formaldehyde, novolac type resin.

Resin D is a commercially available (Synco 640) oil reactive novolac type resin obtained from para-tertiary-butylphenol and formaldehyde.

EXAMPLE 4

This example illustrates the synthesis of a furfuryl alcohol formaldehyde resin useful in the present invention.

This resin, termed Resin E, is produced as follows: Furfuryl alcohol (78.4 lbs.), 37% formalin solution (16.24 lbs.), and oxalic acid (40 g.) are charged to a jacketed kettle equipped with anchor-type stirrer and thermometer and a reflux condenser. While stirring, the temperature of the kettle contents are raised to 100° C. over a period of 45 minutes by means of steam in the jacket. At this point an exothermic reaction becomes obvious, and it is necessary to maintain cooling by circulating water in the jacket for 15 minutes. After another hour and a quarter it is necessary to introduce steam into the jacket to maintain reflux. During the two-hour period of reflux, the viscosities are observed by means of a Ford viscosity cup, and the times increased from 37 seconds to 64.5 seconds. The development of viscosity can be followed by use of a Ford cup or by the so-called "string" method. In the "string" method a portion of resin is placed on a cold plate and stirred with the tip of one's finger. The finger is quickly withdrawn and the length of the string drawn before breaking is observed. At the end of the two-hour reflux period, a sample of the charge is tested in this manner, and gives a two-inch string. The kettle charge is then neutralized with 132 g. triethanolamine. Water is distilled off at atmospheric pressure until the still charge reaches 140° C. The viscosity of the resulting 73.7 pounds of resin is 5600 centipoises at 40° C. A 56.4 pound portion of this resin is mixed with 54 pounds 3 ounces of furfuryl alcohol monomer to give a viscosity of 180 centipoises at 25° C. This mixture, termed Resin E, is useful as a curable material in the present invention.

EXAMPLE 5

This example illustrates the synthesis of a furfuryl alcohol formaldehyde urea resin useful in the present invention.

A resin, termed Resin F, is prepared in a reaction vessel by drawing into the vessel 1000 parts furfuryl alcohol and 540 parts 37% methanol stabilized formaldehyde solution. These materials are mixed with an agitator and heated to 150° F., followed by the addition of 2.5 parts phthalic anhydride and heating to reflux temperature of 220° F. and held at reflux for 2 hours. After this period of reflux, distillate is removed at the rate of 3.2 to 3.3 lbs./min. until 450 parts distillate is obtained, which takes about 140 minutes. The distillate is weighed every 10 minutes to assure following the distillate rate. The vessel temperature rises to 240°–250° F. during this distillation stage. After obtaining the distillate portion, the reaction product is cooled to 200° F., and 30 parts urea (industrial grade) are added slowly with good agitation.

After adding the urea, the temperature is held at approximately 200° F. for from 1 to about 2 hours, until the free formaldehyde content of the resinous material reaches 0.8% maximum, after which water in the amount of 5 parts is distilled off under normal pressure in about 10 to 20 minutes, and the product is cooled to 120° F. and filtered. The furfuryl-formaldehyde-urea resinous product is found to be a relatively stable, dark colored liquid material. If desired, the water may be removed by azeotropic distillation with xylene.

EXAMPLE 6

This example illustrates the synthesis of a urea-formaldehyde-furfuryl alcohol resin useful in the present invention.

This resin, termed Resin G, is produced from a commercially available, unpolymerized, aqueous-equilibrium mixture of urea and formaldehyde, sold under the tradename "U.F. Concentrate-85." A typical analysis of "U.F. Concentrate-85" is 59 weight percent formaldehyde, 26 weight percent urea, and 15 weight percent water. Into 2710 parts of "U.F. Concentrate-85" are admixed 2025 parts of furfuryl alcohol and 654 parts of urea. The pH of the resulting solution is adjusted to 5.7 by the addition of 50% aqueous phosphoric acid. This solution is then charged into a 3-necked vessel equipped with a stirrer, thermometer and reflux condenser. The solution is heated to 100° C. over a period of one hour, and then refluxed at about that temperature for an additional two hours. The degree of resinification is observed by checking the viscosity at regular time intervals. When a withdrawn sample of the solution has a viscosity of 380 centipoises at 25° C., as measured by a Brookfield viscometer, the refluxing is discontinued and 28 parts of sodium phosphate (in 125 parts of water) is admixed to give a pH of 8.08. Upon cooling, the resulting binder composition is a slightly cloudy, light-amber liquid.

EXAMPLE 7

This example illustrates the synthesis of a phenol-formaldehyde-urea formaldehyde resin, termed Resin H, which can be employed in the present invention.

100 parts of phenol, 150 parts of an aqueous formaldehyde solution (37.5% formaldehyde), and 1 part of sodium hydroxide are admixed and heated to a temperature of 65°–70° C. Mixing and heating with reflux are continued until the resulting resin shows a water tolerance of about 300% as determined by the Smith turbidimeter. The resulting resin is then dehydrated to about 65% dissolved solids.

15 parts of this phenol formaldehyde resin are admixed with 15 parts of an aqueous solution of a urea formaldehyde condensate. The aqueous solution of urea formaldehyde contains about 25% urea, about 60% formaldehyde, and about 15% water.

EXAMPLE 8

This example illustrates the synthesis of a urea-modified phenol formaldehyde resin useful in the present invention.

This resin, termed Resin J, is prepared in the following manner. Into a reaction vessel equipped with a reflux condenser, thermometer and stirrer, 653 g. of a phenol-formaldehyde blend, 225 g. of a urea-formaldehyde concentrate, and 5 g. of 50 weight percent aqueous sodium hydroxide solution, are added. The phenol-formaldehyde blend used contains 6.25 moles of formaldehyde and 2.50 moles of phenol, in aqueous solution. The urea-formaldehyde concentrate contains 4.5 moles of formaldehyde and 0.94 mole of urea, in aqueous solution. The reaction mixture in the vessel has a pH of 8.4 and is heated from 75°–212° F. in 40 minutes. After heating for 20 minutes at 212°–215° F., the water miscibility of the reaction mixture has been reduced from greater than 10 to 4. At this time, heating is discontinued and 22 g. of an acid solution consisting of equal parts of 30 weight percent phosphoric acid and glycerol are added to the reaction vessel, lowering the pH of the reaction mixture to 6.4. The temperature of the reaction mixture is then cooled to 110°–120° F. and the excess water distilled under a vacuum of 27″ to 28″ Hg vacuum. As distillation continues, the viscosity of the reaction mixture increases, and after it attains a Gardner-Holdt viscosity of U to V (6.3 to 12.1 stokes), distillation is discontinued. During this distillation, 208.5 g. of distillate is removed, leaving 695 g. of resin product.

EXAMPLE 9

This example illustrates the synthesis of a urea-formaldehyde resin, termed Resin K, which is useful in the present invention.

The procedure of Example 1 of U.S. Pat. 2,191,957 is followed exactly. The "resulting product" having the indicated nitrogen analysis is Resin K.

EXAMPLE 10

This example illustrates the synthesis of a melamine formaldehyde resin useful in the present invention.

This resin, termed Resin L, is prepared by dissolving 653 parts of paraformaldehyde (containing 91% formaldehyde and 9% water) in 390 parts of methanol and 131 parts of water, containing about 1.1 parts of 50% triethanolamine and about 1.2 parts of 20% sodium hydroxide solution, by warming and stirring. The pH of the resulting solution is 9.7. It is adjusted to 8.1 with formic acid. 756 parts of melamine (6 mols) are then added. The mixture is heated to reflux in about 10 minutes and refluxed (76°–79° C.) for about 40 minutes. A pasty solution is formed with a pH about 8.8. 2090 parts of methanol are then added, followed by 6.4 parts of oxalic acid crystals. The reaction mass is again heated to reflux and refluxed (68°–72° C.) for 45 minutes. During the reaction, the mixture gradually clears up. At the end of the reaction, the product is slightly cooled and neutralized with about 21 parts of 20% sodium hydroxide to bring the pH to 10.2. It is filtered with a filter aid (e.g. Supercel), and the filtrate vacuum-concentrated at temperatures below 45° C. to a Gardner-Holdt viscosity at 25° C. of Z–1 to Z–2. The product, which amounts to 1723 parts, is cut back to a viscosity of X–Y with 49 parts of water. The resin is clear, and completely soluble in water.

EXAMPLE 11

This example illustrates the synthesis of a compound which functions as an inert catalytic agent useful in the present invention. This catalytic agent, trimethylamine methacrylimide which yields trimethylamine catalyst upon heating, is prepared as follows.

To 264 g. (4.3 mole) of unsymmetrical dimethyl hydrazine in 2 liters of cold benzene is added 208 g. (20 moles) of methacrylyl chloride with stirring. After two hours, the addition is completed and a yellow solid precipitates out. The reaction mixture is warmed to room temperature and the product is filtered. The product is extracted four times with 1 liter portions of warm benzene. Evaporation of the benzene extract in vacuo yields 134.4 g. (53%) of 1,1-dimethyl methacrylic hydrazide, a white solid having a melting point of 67°–70° C. The infrared spectrum of the product shows a NH absorption band at 3200 cm.$^{-1}$, double bond absorption at 3040 and 1630 cm.$^{-1}$ and amide carbonyl absorptions at 60 and 70 and 50 and 40 cm.$^{-1}$.

In 225 ml. of acetonitrile is dissolved 20.0 g. (0.154 mole) of the 1,1-dimethyl methacrylic hydrazide and 28.6 g. (1.54 moles) of methyl-p-toluene sulfonate. The reaction mixture is agitated and refluxed for six hours. On cooling to room temperature, 2-methacrylyl-1,1,1-trimethyl hydrazinium p-toluene sulfonate crystallizes out of the reaction mixture. The product obtained weighs 32.2 g. (68%), and has a melting point of 150°–1° C. On evaporation of the solvent, an additional 15 g. of the sulfonate is obtained.

The 2-methacrylyl-1,1,1-trimethyl hydrazinium p-toluene sulfonate is dissolved in 100 ml. of distilled water and 10% sodium hydroxide solution is added until a phenophalein end point is reached. Evaporation of the water in vacuo results in a white solid which is extracted with warm chloroform. Evaporation of the chloroform results in 9.0 g. (quantitative) of trimethylamine methacrylylimide having a melting point of 149°–152° C. Infrared and nuclear magnetic resonance analyses confirm the structure of the product.

*Analysis.*—Calculated for $C_7H_{14}N_2O$ (percent): C, 59.12; H, 9.92; N, 19.70. Found (percent); C, 59.24; H, 9.89; N, 19.54.

EXAMPLE 12

This example illustrates a commercially available inert catalytic agent which, upon heating, releases a cross-linking catalyst capable of cross-linking some of the resinous curable materials useful in the present invention.

The catalytic agent is boron trifluoride urea, sold under the tradename "B–130" from Alfa Inorganics, Inc. Upon heating, this catalytic agent releases boron trifluoride catalyst.

EXAMPLE 13

This example shows the preparation of a catalytic agent and a catalytic pill which are useful in the present invention.

This catalyst, termed Catalyst B, is obtained by charging into a round-bottom flask equipped with stirrer and thermometer 80 g. (0.90 mole) glacial acrylic acid and 100 g. of methyl alcohol. To this solution, 85 g. (0.95 mole) dimethylethanol amine is added gradually. During this addition, sufficient cooling is applied to maintain temperature below 30° C.

This solution of dimethylethanol amine acrylate is coated on 40 mesh iron filings as follows:

|  | G. |
|---|---|
| Amine acrylate solution | 10 |
| Iron filings | 50 |

After mixing thoroughly, the methanol solvent is evaporated from the mixture. This free-flowing, amine-coated iron is used as a catalytic pill according to the present invention. This catalytic pill releases dimethyl ethanol amine when subjected to an inductive field.

EXAMPLE 14

This example illustrates the construction of a catalytic pill useful in the present invention.

A solution of trimethylamine methacrylimide (2.25 g.) in water (10 ml.) is prepared. To this solution is added iron filings (6.75 g.) which pass through a screen of 20 mesh/inch but are retained on a screen of 50 mesh/inch.

The solution is evaporated to dryness, whereupon the triethylamine methacrylimide is found adhering to the surfaces of the particles of iron. This composite structure which is an inert heat activable curing agent, is termed Catalytic Pill A. This catalytic pill releases trimethylamine when subjected to an alternating inductive field.

EXAMPLE 15

This example illustrates the construction of a catalytic pill useful in the present invention.

The procedure of Example 14 is repeated with the exception that the trimethylamine methacrylimide is replaced with an equivalent weight of dimethyl ethanol amine. This composite structure, which is an inert heat activable curing agent, is termed Catalytic Pill B.

EXAMPLE 16

This example illustrates the construction of a catalytic pill useful in the present invention.

The procedure of Example 14 is repeated with the exception that the iron filings are replaced with an equivalent weight of magnetite ($Fe_3O_4$) and the trimethylamine methacrylimide is replaced with an equivalent weight of dimethyl ethanol amine acrylate. This composite structure, which is an inert heat activable curing agent, is termed Catalytic Pill C.

EXAMPLE 17

This example illustrates the construction of a catalytic pill useful in the present invention. This catalytic pill, termed Catalytic Pill D, releases boron trifluoride when subjected to an alternating inductive field.

Boron trifluoride urea (30 g.) is dissolved in ethyl alcohol (90 g.) as a solvent. To this solution are added iron filings (79 g.) which pass through a 10 mesh/inch screen but are retained on a 40 mesh/inch screen. The solution is evaporated to dryness by letting it stand at 50° C. for 24 hours. The boron trifluoride urea adheres to the surface of the iron filings.

EXAMPLE 18

This example illustrates the construction of yet another catalytic pill useful in the present invention.

Activated charcoal (100 g.) commercially available as "Darco 60" is placed in a first closed vessel fitted with an inlet and an outlet line. A stream of air is passed first through a second closed vessel containing trimethylamine, and then through the first closed vessel where the trimethylamine is adsorbed on the charcoal. The charcoal is then placed in an open dish containing a solution of paraffin wax (50 g.) having a melting point of 135° F. and gasoline (50 ml.). The solution is evaporated to dryness with stirring. The charcoal is found to have a coating of the paraffin wax. This composite structure is termed Catalytic Pill E.

EXAMPLE 19

This example illustrates the construction of a catalytic pill, termed Catalytic Pill F, which releases carbon dioxide when subjected to an alternating inductive field.

Malonic acid (20 g.) is dissolved in ethyl alcohol (50 g.) as solvent. To this solution is added iron filings (40 g.) which pass through a screen of 20 mesh/inch but are retained on a 50 mesh/inch screen. The solution is then evaporated to dryness by heating the mixture at a temperature of 100° F. The malonic acid is found adhering to the iron filings.

EXAMPLE 20

This example illustrates the construction of a catalytic pill, termed Catalytic Pill G, which releases chlorine when subjected to an alternating inductive field. Catalytic Pill G is useful to promote the cross-linking of curable materials such as the phenol formaldehyde resins or the furan resins.

Activated charcoal (100 g.) commercially available as "Darco 60" is placed in a closed vessel fitted with an inlet and an outlet. Chlorine gas is passed through the vessel until 22 g. of chlorine has been absorbed onto the charcoal. The chlorine containing charcoal (122 g.) is mixed with iron filings (75 g.) which pass through a screen of 20 mesh/inch and are retained on a screen of 50 mesh/inch. This mixture (197 g.) is placed in an open dish containing a solution of paraffin wax (30 g.) of a melting point of 135° F. and keorsene (60 ml.) to form a slurry. This slurry is evaporated to dryness at 35° C. and the resultant product granulated into particles which pass through a screen of 4 mesh/inch. This product is Catalytic Pill G.

EXAMPLE 21

This example illustrates how sand cores are cured with the process of the present invention.

A foundry mix is prepared by mixing 1000 g. of Wedron silica sand with 5 g. of Resin A, 10 g. of a 65% solution of 4,4'-diphenyl methane diisocyanate in 35% aromatic solvent (Solvesso 100), and 9 g. of Catalytic Pill A.

Using this foundry mix, experimental test cores are made by compacting 170 g. of this mix into a 4" long, hollow, plastic cylinder having a 2" internal diameter.

These test cores are cured by placing the plastic cylinder into a 450 kilocycle inductive field, created by passing 11 kilowatts through a single turn coil having an internal diameter of 2½". The foundry mix in the cylinder cures in less than 60 seconds.

EXAMPLE 22

The procedure of Example 21 is repeated employing the same times, conditions, and components with the exception that Catalytic Pill A is replaced with an equivalent weight of Catalytic Pill B. Similar results are obtained.

EXAMPLE 23

The procedure of Example 21 is repeated employing the same times, conditions, and components with the exception that no catalytic pill is used. Curing is not evident after 10 minutes exposure to the inductive field.

EXAMPLE 24

This example illustrates the construction and curing of a foundry core according to the process of the present invention.

A foundry mix is prepared by mixing Resin E (20 g.) with Wedron silica sand (1000 g.). The mixing is accomplished by placing the resin and the sand in an open vessel and stirring the mixture with a small hand-held stick until the resin evenly coats the sand particles, as evidenced by a wet, even appearance. Then Catalytic Pill D (10 g.) is added slowly to the mixture while stirring it for an additional five minutes. By this procedure, even coating of the sand by the resin is ensured, and even distribution of the catalytic pills throughout the foundry mix is ensured.

This foundry mix (170 g.) is then rammed into a 4" long, 2" diameter plastic cylinder which is then placed in a 450 kilocycle inductive field, created by passing a current of 11 kilowatts through a single turn coil having an internal diameter of 2½". The mixture in the cylinder cures in less than 60 seconds.

EXAMPLE 25

This example illustrates the construction and curing of a foundry mold according to the process of the present invention.

A pre-dried molding sand material "4 screen sand" (1000 g.) having a mean moisture level of not more than ½ of 1% is mulled with Resin F (20 g.) and catalytic pill D (1 g.) until good distribution is obtained, as noted by an appearance of uniform wetting of the granules. These granules are then ready for packing, as a free-flowing binder and sand mix, into a mold or core form. The sand mix may be held for several hours and occasionally, if desired, several days, before forming the mold form.

The coated sand is then packed into a cardboard box 2" x 2" x 2" to provide a valve casing mold. This packed cardboard box is then subjected to an alternating inductive field of 2 megacycles, created by passing 10 kilowatts through a double turn coil having an internal diameter of 3". The material cures in less than 60 seconds.

EXAMPLE 26

This example illustrates the construction and curing of a foundry core according to the process of the present invention.

Sodium silicate is used as the binder. In this case, a commercial sodium silicate solution, No. 22, obtained from duPont, was used. This material has an $SiO_2/Na_2O$ ratio of 1.90 and a solids content of 43.5%. The sodium silicate solution (60 g.) is thoroughly mixed with Wedron silica sand (1000 g.) and catalytic pill F (60 g.) to form a foundry mix. This foundry mix is then rammed into a 2" internal diameter plastic cylinder which is then placed in a 450 kilocycle inductive field, created by passing a current of 11 kilowatts through a single turn coil having an internal diameter of 2½". The mixture in the cylinder cures in less than 60 seconds.

EXAMPLE 27

This example illustrates the curing of foundry cores according to the process of the present invention, employing different curable materials and different catalytic pills.

The procedure of Example 24, is repeated employing the same conditions, ingredients and times, except that Resin E is replaced with an equal weight of Resin F. Similar results are obtained.

EXAMPLE 28

This example illustrates the curing of foundry cores according to the process of the present invention, employing different curable materials.

The procedure of Example 24 is repeated employing the same conditions, ingredients and times, except that Resin E is replaced with an equal weight of Resin H. Similar results are achieved.

EXAMPLE 29

This example illustrates the curing of foundry cores according to the process of the present invention, employing different curable materials.

The procedure of Example 24 is repeated employing the same conditions, ingredients and times, except that Resin E is replaced with an equal weight of Resin K. Similar results are achieved.

EXAMPLE 30

This example illustrates the curing of foundry cores according to the present invention employing a different Catalytic Pill.

The procedure of Example 24 is repeated employing the same conditions, ingredients and times except that Resin E is replaced by Resin H ( 40 g.) and Catalytic Pill D is replaced by a Catalytic Pill G (5 g.). Similar results are achieved.

Although the invention has been described in considerable detail with reference to certain preferred embodiments thereof, it will be understood that variations and modifications can be effected within the spirit and scope of the invention as described above and as defined in the appended claims.

What is claimed is:

1. A process for the catalytic cross-linking of a curable material, comprising, in sequence, the steps of:
   (A) forming a mixture comprising:
      (1) the curable material comprising a resin component and a hardner component wherein said resin component comprises an organic solvent solution of a non-aqueous phenolic resin and said hardner component comprises a liquid polyisocyanate containing at least two isocyanate groups, and
      (2) a catalytic agent which, upon heating, releases a catalyst selected from hydrogen halides, Lewis acids, tertiary amines, or amine imides which promotes curing of the curable material, and
      (3) an inductively heatable material in thermal proximity with the catalytic agent, and then
   (B) subjecting the mixture to an alternating inductive field, whereby the heat generated in the inductively heatable material is transferred to the catalytic agent, releasing the catalyst and promoting curing of the curable material.

2. The process of claim 1 wherein the mixture further comprises a particulate solid.

3. The process of claim 2 wherein the particulate solid is a foundry aggregate.

4. The process of claim 1 wherein the inductiviely heatable material is ferromagnetic.

5. The process of claim 4 wherein the inductively heatable material is iron.

6. The process of claim 4 wherein the inductively heatable material is magnetite.

7. The process of claim 1 wherein the catalyst is gaseous at ambient conditions.

8. The process of claim 1 wherein the tertiary amine has the formula:

(IV) 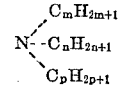

wherein $m$, $n$, and $p$ are each integers equal to 1 to 3 inclusive and $m+n+p$ equals 3 to 9.

9. The process of claim 8 wherein the tertiary amine is trimethylamine.

10. The process of claim 1 wherein the catalytic agent is an amine imide of the formula:

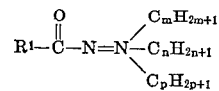

wherein $R^1$ is a hydrocarbon radical of 1 to 25 carbon atoms and wherein $m$, $n$, and $p$ are each integers equal to 1 to 3 inclusive and $m+n+p$ equals 3 to 9.

11. The process of claim 1 wherein the catalytic agent is an amine imide of the formula:

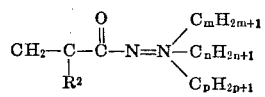

wherein $R^2$ is hydrogen, methyl or ethyl, and $m$, $n$, and $p$ are each integers equal to 1 to 3 inclusive and $m+n+p$ equals 3 to 9.

12. The process of claim 1 wherein the binder composition is a phenolic resin which is the condensation product of a phenol having the general formula:

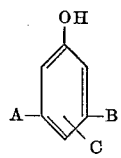

wherein A, B, and C are hydrogen, hydrocarbon radicals, oxyhydrocarbon radicals, or halogen, with an aldehyde having the general formula R'CHO wherein R' is a hydrogen or a hydrocarbon radical of 1 to 8 carbon atoms.

13. The process of claim 1 wherein the aldehyde is formaldehyde and A, B, and C are hydrogen.

14. The process of claim 1 wherein the phenolic resin is a novolac resin.

15. The process of claim 1 wherein the phenolic resin has the general formula:

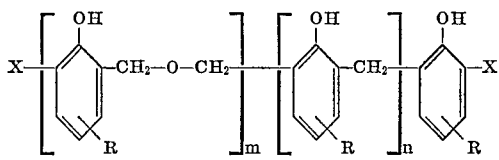

wherein R is hydrogen or a phenolic substituent meta to the hydroxyl group of the phenol, $m$ and $n$ are numbers the sum of which is at least 2 and the ratio of $m$-to-$n$ is at least 1, and X is a hydrogen or a methylol group, the molar ratio of said methylol group to hydrogen being at least 1.

16. The process of claim 1, wherein the polyisocyanate is diphenylmethane diisocyanate.

17. A catalytic pill adapted to promote curing of a curable material when subjected to an alternating inductive field, said pill comprises:
   (A) a catalytic agent which, upon heating, releases a cross-linking catalyst selected from hydrogen halides, Lewis acids, tertiary amines, or amine imides which promotes curing of the curable material, and
   (B) an inductively heatable material in thermal proximity with the catalytic agent.

18. The catalytic pill of claim 17 wherein the inductively heatable material is in the form of a particulate solid and the catalytic agent is in the form of a coating on the surface of the particulate solid.

19. The catalytic pill of claim 17 wherein the inductively heatable material is ferromagnetic.

20. The catalytic pill of claim 19 wherein the inductively heatable material is iron.

21. The catalytic pill of claim 17 wherein the inductively heatable material is magnetite.

22. The catalytic pill of claim 17 wherein the inductively heatable material is in the form of a porous agglomerate.

23. The catalytic pill of claim 17 wherein the catalytic agent is boron trifluoride urea.

24. The catalytic pill of claim 18 wherein the tertiary amine has the formula:

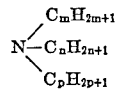

wherein $m$, $n$, and $p$ are each integers equal to 1 to 3 inclusive and $m+n+p$ equals 3 to 9.

25. The catalytic pill of claim 18 wherein the tertiary amine is trimethylamine.

26. The catalytic pill of claim 17 wherein the amine imide has the formula:

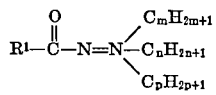

wherein $R^1$ is a hydrocarbon radical of 1 to 25 carbon atoms and wherein $m$, $n$, and $p$ are each integers equal to 1 to 3 inclusive and $m+n+p$ equals 3 to 9.

27. The catalytic pill of claim 17 wherein the amine imide has the formula:

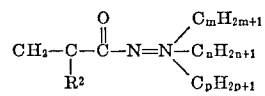

wherein $R^2$ is hydrogen, methyl, or ethyl, and $m$, $n$, and $p$ are each integers equal to 1 to 3 inclusive and $m+n+p$ equals 3 to 9.

28. The method of claim 1 wherein the inductively heatable material is present in an amount from 0.1 percent to 5 percent by weight of the foundry mix.

29. A method of making foundry cores and/or molds which comprises:
   (A) forming a foundry mix comprising:
      (1) a foundry aggregate
      (2) a curable binder comprising a resin component and a hardner component wherein said resin component comprises an organic solvent solution of a non-aqueous phenolic resin and said hardner component comprises a liquid polyisocyanate containing at least two isocyanate groups, and
      (3) a catalytic agent which, upon heating, releases a catalyst selected from hydrogen halides, Lewis acids, tertiary amines, or amine imides which promotes curing of the curable binder, and
      (4) an inductively heatable material in thermal proximity with the catalytic agent;
   (B) shaping the foundry mix in a desired configuration; and
   (C) subjecting the shaped foundry mix to an alternating inductive field, whereby the heat generated in the inductively heatable material is transferred to the catalytic agent, releasing the catalyst and promoting curing of he curable binder.

30. The method of claim 29 wherein the inductively heatable material is ferromagnetic.

31. The method of claim 29 wherein the inductively heatable material is present in an amount from 0.1 percent to 5 percent by weight of the foundry mix.

References Cited

UNITED STATES PATENTS

| | | | |
|---|---|---|---|
| 2,374,136 | 4/1945 | Rothrock | 260—59 |
| 2,393,541 | 1/1946 | Kohler | 264—25 |
| 2,683,296 | 7/1954 | Frumm et al. | 260—SAND MOLD |
| 3,008,205 | 11/1961 | Blaies | 260—39 X |
| 3,249,658 | 5/1966 | Hodges | 264—25 |
| 3,259,947 | 7/1966 | Knight | 164—43 |
| 3,429,848 | 2/1969 | Robins | 260—59 |

FOREIGN PATENTS

| | | | |
|---|---|---|---|
| 1,035,967 | 9/1953 | France | 264—25 |

LEWIS T. JACOBS, Primary Examiner

U.S. Cl. X.R.

260—DIE 40